(12) United States Patent
Kiyose

(10) Patent No.: US 10,445,039 B2
(45) Date of Patent: Oct. 15, 2019

(54) COMPUTER-READABLE STORAGE MEDIUM, METHOD, AND PRINTING SYSTEM

(71) Applicant: Brother Kogyo Kabushiki Kaisha, Nagoya-shi, Aichi-ken (JP)

(72) Inventor: Katsumi Kiyose, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/128,594

(22) Filed: Sep. 12, 2018

(65) Prior Publication Data

US 2019/0079715 A1    Mar. 14, 2019

(30) Foreign Application Priority Data

Sep. 13, 2017   (JP) ................................ 2017-175799

(51) Int. Cl.
*H04N 1/00* (2006.01)
*G06F 3/12* (2006.01)
*G06K 15/00* (2006.01)

(52) U.S. Cl.
CPC .......... *G06F 3/1252* (2013.01); *G06F 3/1208* (2013.01); *G06K 15/4045* (2013.01)

(58) Field of Classification Search
None
See application file for complete search history.

(56) References Cited

U.S. PATENT DOCUMENTS

| | | | |
|---|---|---|---|
| 8,477,362 B2 | 7/2013 | Fujita | |
| 8,687,228 B2 | 4/2014 | Fujita | |
| 2003/0069921 A1* | 4/2003 | Lamming | G06F 16/9577 709/203 |
| 2010/0245852 A1* | 9/2010 | Fujita | G06F 3/1205 358/1.2 |
| 2013/0169978 A1 | 7/2013 | Fujita | |
| 2017/0104888 A1* | 4/2017 | Nomura | H04N 1/3878 |

FOREIGN PATENT DOCUMENTS

JP    2010-231377 A    10/2010

* cited by examiner

*Primary Examiner* — Frantz Bataille
(74) *Attorney, Agent, or Firm* — Banner & Witcoff, Ltd.

(57) ABSTRACT

A non-transitory computer readable storage medium storing computer readable instructions executable by a computer in an information processing apparatus connected with a printer, is provided. The computer readable instructions cause the information processing apparatus to generate image data, rasterize, in a specific print-controlling, the generated image data and transmit the rasterized image data to the printer and, output, in an administrating, the generated image data to one of the first channel and the second channel. The computer readable instructions cause the administering to select one of the first channel and the second channel, command to generate first-typed image data based on a first margin condition when the first channel is selected and second-typed image data based on a second margin condition when the second channel is selected, and output the first-typed data, when generated, to the first channel and the second-typed image data, when generated, to the second channel.

15 Claims, 11 Drawing Sheets

| Printing Apparatus Name | Feasible Channel(s) |
|---|---|
| Printing Apparatus 1A | First |
| Printing Apparatus 1B | Second |
| Printing Apparatus 1C | First, Second |

COMPUTER-READABLE STORAGE MEDIUM, METHOD, AND PRINTING SYSTEM

CROSS REFERENCE TO RELATED APPLICATION

This application claims priority from Japanese Patent Application No. 2017-175799, filed on Sep. 13, 2017, the entire subject matter of which is incorporated herein by reference.

BACKGROUND

Technical Field

An aspect of the present disclosure is related to a printing system, a computer-readable storage medium storing a program to be run on an information processing apparatus capable of communicating with a printer, and a method to control the printing system.

Related Art

An information processing apparatus capable of communicating with a printer to have an image printed by the printer is known. The information processing apparatus may generate and output image data of an image to be printed by the printer to the printer. The image data to be output from the information processing apparatus to the printer may include data for margins to be reserved on a printing medium when the image is printed.

Meanwhile, for example, a technique to extend functionality of an application program to be installed in a computer, which is connected with a printing apparatus, in order to print an enlarged or contracted image is known. The computer may obtain margin information and sheet-size information set through the extended application program, compute a magnification rate for enlarging or contracting the image, and update the margin information with reference to the computed magnification rate and the original margin information.

SUMMARY

In recent years, information processing apparatuses having a so-called driverless printing function, such as AirPrint (registered trademark), which enables image printing in conformity with a predetermined printing standard without using a printer driver, have been introduced. The information processing apparatus may transfer image data for an image to be printed to a printer in conformity with a predetermined printing standard using a basic print controlling function provided by Operating System (OS). The printer receiving the image data may print an image based on the image data according to a program installed in the printer in conformity with a predetermined printing standard.

The basic print controlling function usable as above may provide fewer or less complicated print setting options to a user, and a level of printing quality available from the basic print controlling function may not be satisfactory to the user. In order to overcome the insufficiency, more advanced or detailed print setting options may be achieved through a specialized print controlling function applicable to a specific printer, which may be obtained separately from the OS and applied to the printer. The information processing apparatus equipped with the specialized print controlling function may process the image data for the image to be printed by a program specifically designed for the printer. Meanwhile, the printer may print an image based on the image data processed by the specifically designed program. The information processing apparatus equipped with the different print controlling programs may have a plurality of processing channels to process the image data between the information processing apparatus and the printer, even when the information processing apparatus and the printer are connected with each other through a single communication interface.

Within an information processing apparatus having a plurality of processing channels, different print-controlling functions taking different processing channels may require different types of image data for printing. For example, a print-controlling function may require image data not including data for margins but may require data for solely a body of the image. In order to print an image together with margins on a sheet based on the image data not including margins, margin information concerning the margins appended to the image data may be input in a processor for the print-controlling function. For another example, a print-controlling function may require image data containing data for margins. In this case, no margin information may be appended to the image data to be input in the processor for the print-controlling function in order to achieve an image printed on a sheet with margins. Thus, image data to be required by a print-controlling function may differ depending on a processing channel to be taken by the print-controlling function. In particular, margins in certain image data adapted to a certain processing channel may not be reproduced in a same manner through another processing channel, and through the another processing channel, an image may come out be displaced from an intended position on the sheet due to an influence of the differently handled margins.

The present disclosure is advantageous in that a technique in a printing system, having a printer and an information processing apparatus with a plurality of processing channels there-between, by which a desirable printed outcome may be achieved regardless of the processing channel to be taken, is provided.

According to an aspect of the present disclosure, a non-transitory computer readable storage medium storing computer readable instructions that are executable by a computer in an information processing apparatus is provided. The information processing apparatus has a communication interface, through which the information processing apparatus is connected with a printer. The information processing apparatus has a first channel and a second channel being processing channels configured to cause the printer to print an image based on data of the image. The computer readable instructions, when executed by the computer, cause the information processing apparatus to generate image data in a generating, rasterize, when the generated image data is input, in a specific print-controlling, the generated image data and transmit, in the specific print-controlling, the rasterized image data to the printer, and output, in an administrating, the generated image data to one of the first channel, through which the image is printed by the specific print-controlling, and the second channel, through which the image is printed by a basic print-controlling executed by an operating system installed in the information processing apparatus. In the administrating, the computer readable instructions cause the information processing apparatus to select one of the first channel and the second channel; command to generate first-typed image data when the first channel is selected, the first-typed image data being generated based on a first margin condition, and second-typed image data when the second channel is selected, the second-typed image data being generated based on a second margin condition; and output the first-typed image data to the first channel when the first-typed image data is generated and the second-typed image data to the second channel when the second-typed channel is generated.

According to another aspect of the present disclosure, a method implementable on a processor coupled with an information processing apparatus in a printing system is provided. The information processing apparatus is connected with a printer to communicate mutually through a specific communication interface. The printing system has processing channels configured to cause the printer to print an image based on data of the image. The processing channels include a first channel and a second channel. The method includes generating image data in a generating, rasterizing, when the generated image data is input, in a specific print-controlling, the generated image data in the information processing apparatus and transmitting, in the specific print-controlling, the rasterized image data to the printer, and outputting the generated image data in the information processing apparatus to one of the first channel, through which the image is printed by the specific print-controlling, and the second channel, through which the image is printed by a basic print-controlling executed by an operating system installed in the information processing apparatus. The outputting the generated image data to the one of the first channel and the second channel includes selecting the one of the first channel and the second channel; commanding to generate one of first-typed image data when the first channel is selected, the first-typed image data being generated based on a first margin condition, and second-typed image data when the second channel is selected, the second-typed image data being generated based on a second margin condition; and outputting the first-typed image data to the first channel when the first-typed image data is generated and the second-typed image data to the second channel when the second-typed image data is generated.

According to still another aspect of the present disclosure, a printing system having an information processing apparatus and a printer, which are configured to communicate with each other through a specific communication interface, is provided. The printing system has processing channels configured to cause the printer to print an image based on data of the image. The processing channels include a first channel and a second channel. The information processing apparatus includes a generating means configured to generate image data, a specific print-controlling means associated with the printer, the specific print-controlling means being configured to rasterize the image data generated by the generating means in response to input of the image data therein and transmit the rasterized image data to the printer, and an administering means configured to output the image data generated by the generating means from the generating means to one of the first channel, through which the image is printed with use of the specific print-controlling means, and the second channel, through which the image is printed with use of a basic print-controlling means executed by an operating system installed in the information processing apparatus. The administering means includes a selecting means configured to select one of the first channel and the second channel; a commanding means configured to command the generating means to generate one of first-typed image data when the first channel is selected by the selecting means, the first-typed image data being generated based on a first margin condition, and second-typed image data when the second channel is selected by the selecting means, the second-typed image data being generated based on a second margin condition; and an outputting means configured to output the first-typed image data to the first channel when the first-typed image data is generated by the generating means and the second-typed image data to the second channel when the second-typed image data is generated by the generating means.

BRIEF DESCRIPTION OF THE ACCOMPANYING DRAWINGS

Figure 7:
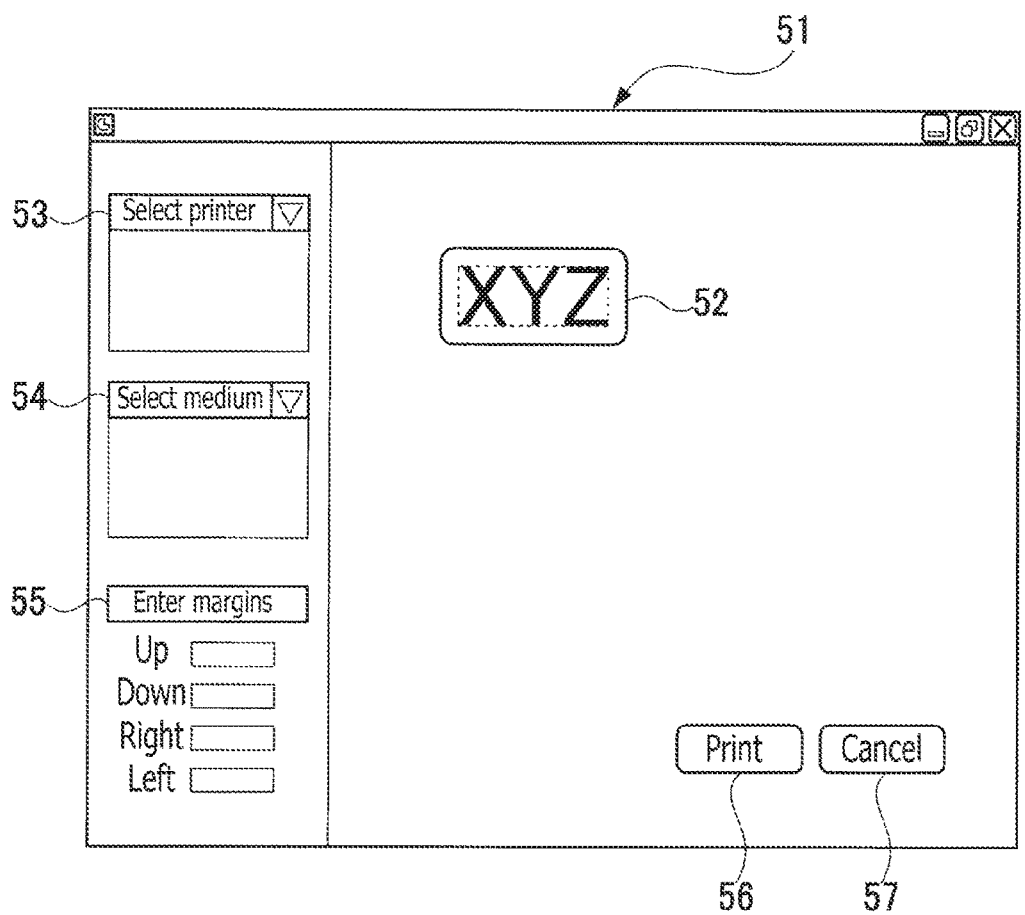

FIG. 7 an illustrative view of an editor screen to be displayed in the information processing apparatus according to the embodiment of the present disclosure.

Figure 8:
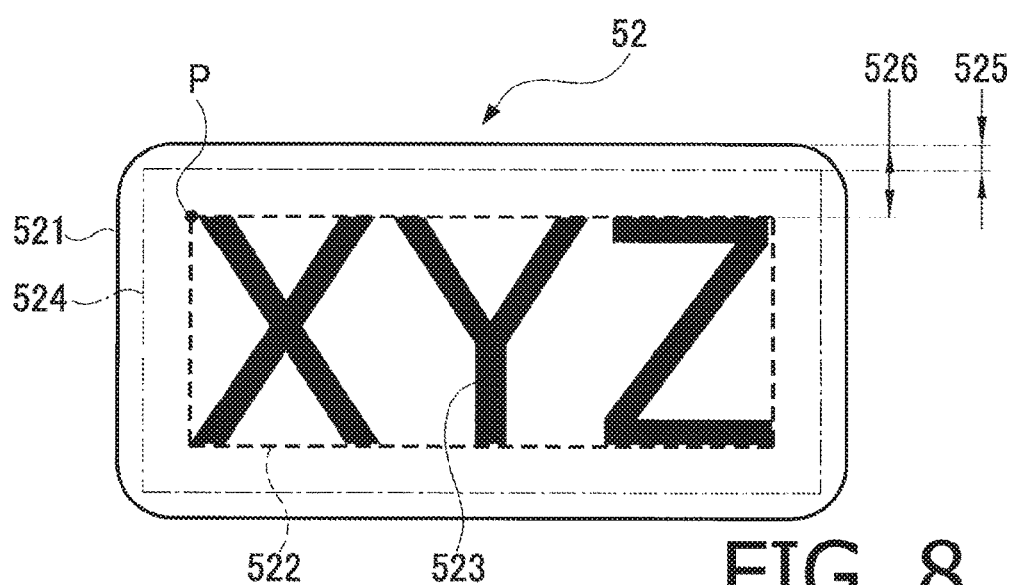

FIG. 8 is an illustrative view of a preview image in the information processing apparatus according to the embodiment of the present disclosure.

Figure 9:
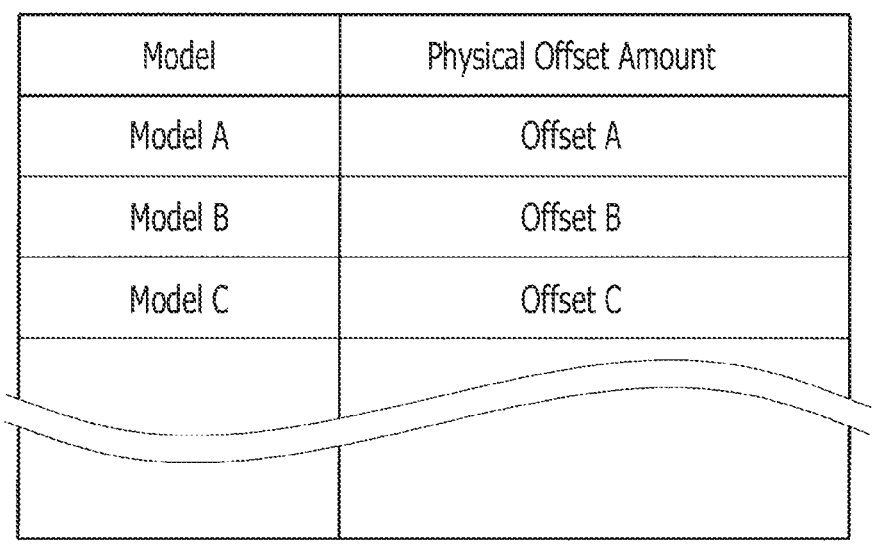

FIG. 9 is a table to illustrate model information to be stored in the information processing apparatus according to the embodiment of the present disclosure.

Figure 10:
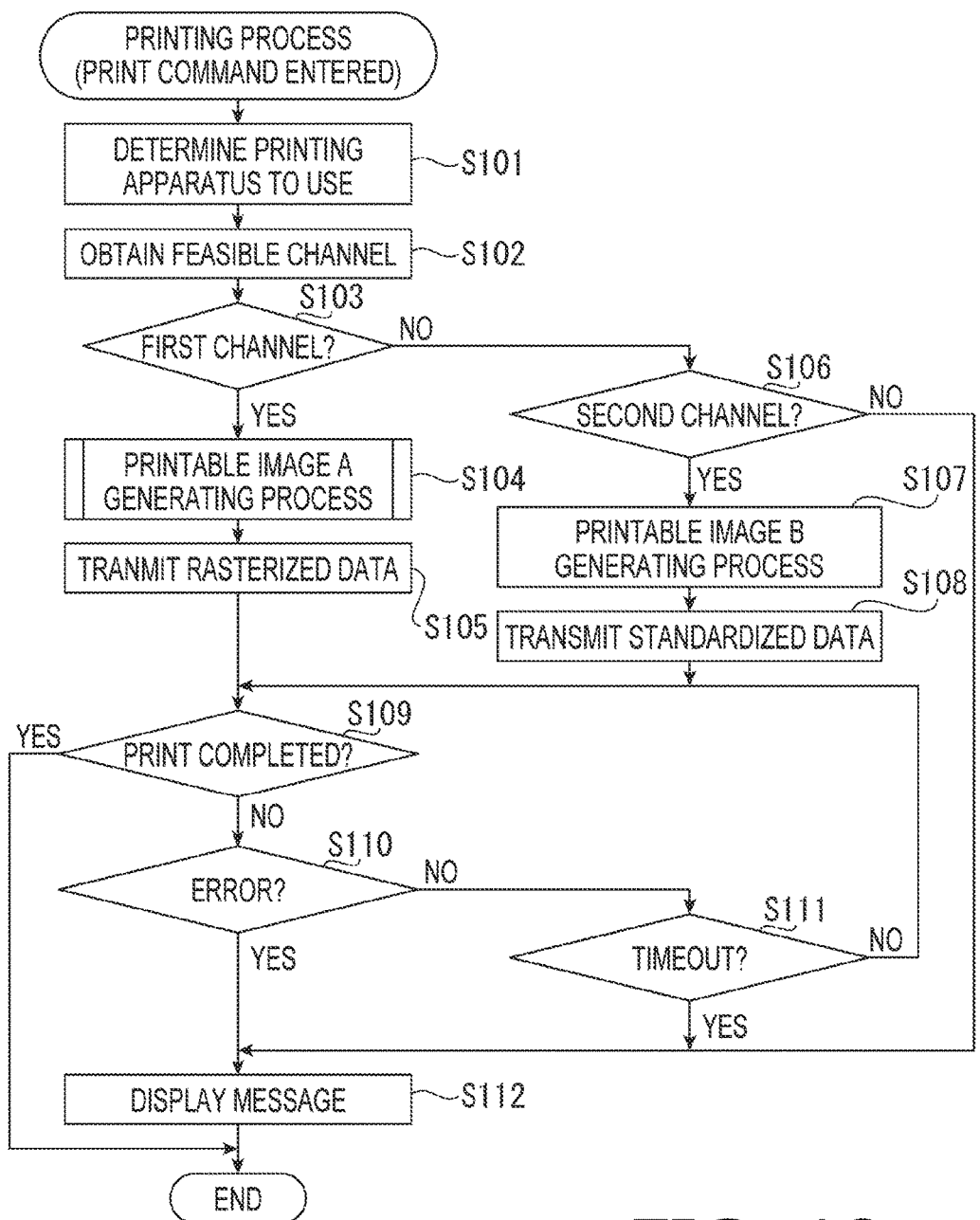

FIG. 10 is a flowchart to illustrate flows of steps in a printing process in the information processing apparatus according to the embodiment of the present disclosure.

Figure 11:
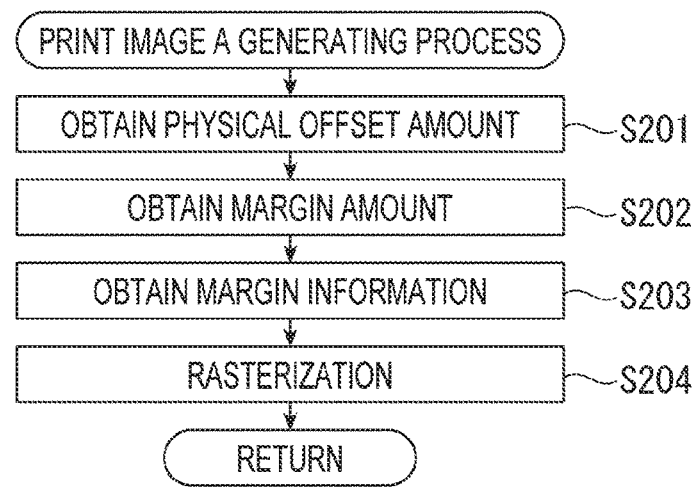

FIG. 11 is a flowchart to illustrate flows of steps in a printable image A generating process in the information processing apparatus according to the embodiment of the present disclosure.

Figure 12:
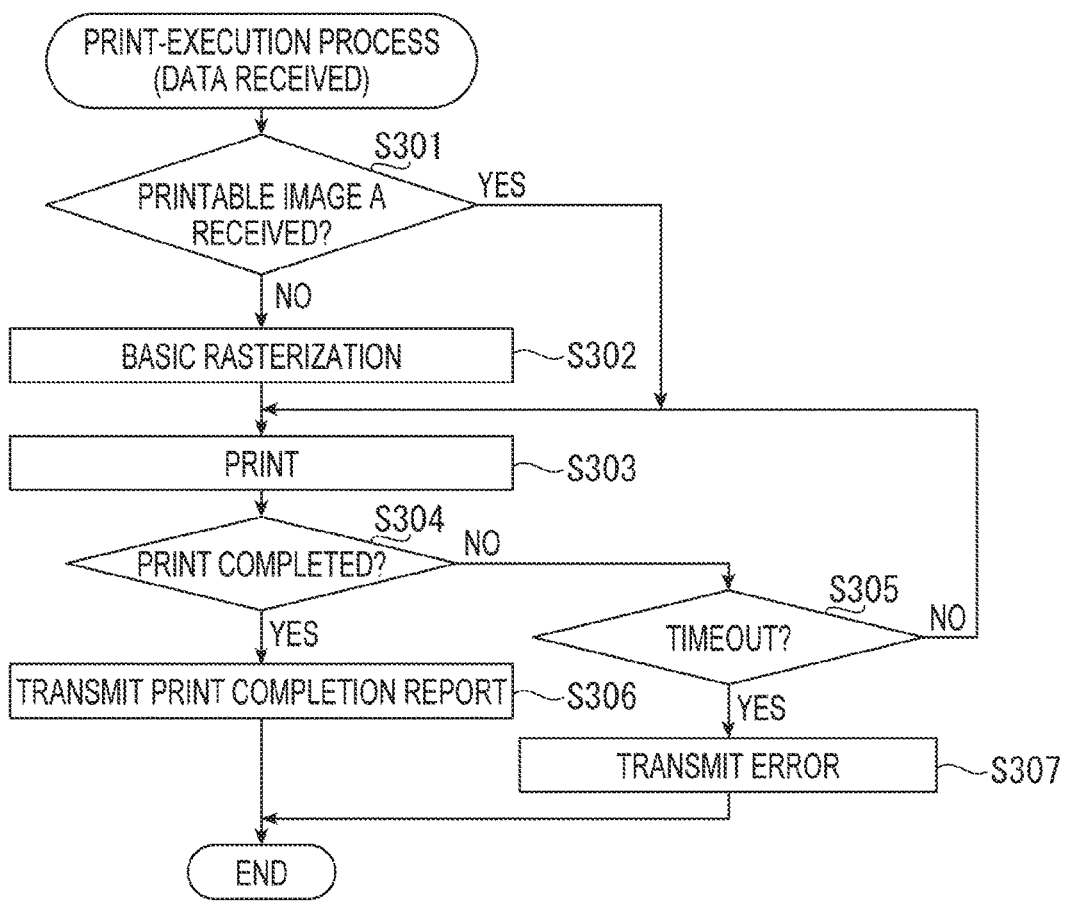

FIG. 12 is a flowchart to illustrate flows of steps in a print-execution process in the information processing apparatus according to the embodiment of the present disclosure.

DETAILED DESCRIPTION

Hereinafter, with reference to the accompanying drawings, described below will be a printing system 100 as an embodiment of the present disclosure.

Figure 1:
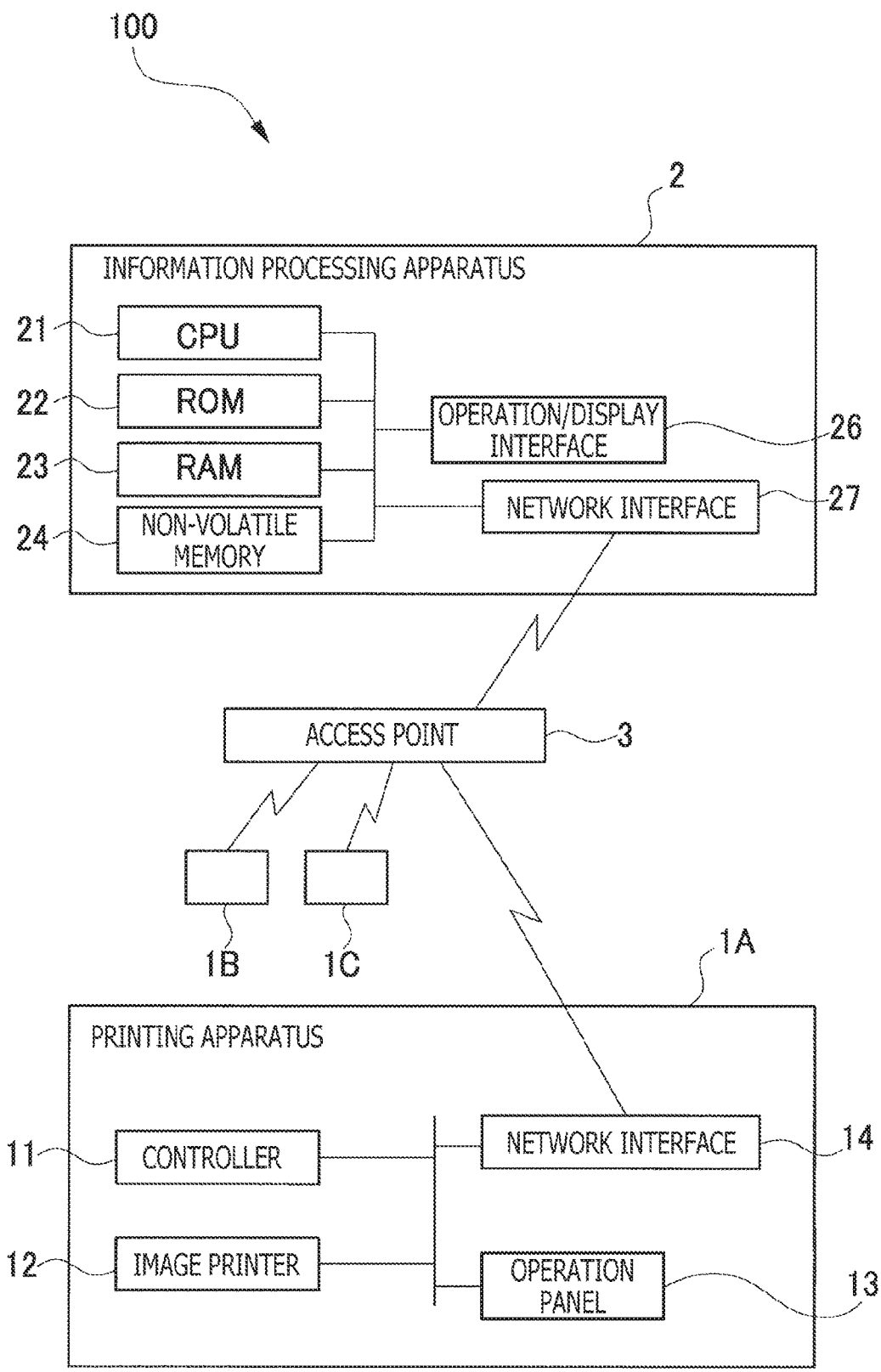
FIG. 1 is a block diagram to illustrate a printing system according to an embodiment of the present disclosure.

The printing system 100 according to the present embodiment includes, as shown in FIG. 1, a plurality of printing apparatuses 1A, 1B, 1C and an information processing apparatus 2 that may communicate with one another. The printing apparatuses 1A, 1B, 1C may each print an image on a printable medium and may include, for example, a label printer, a page printer, a copier, and a multifunction peripheral device. In the following paragraphs, when there is no particular need to distinguish the printing apparatuses 1A, 1B, 1C from one another, the printing apparatuses 1A, 1B, 1C may be generally called as a printing apparatus 1. The information processing apparatus 2 may generate and process image data for the image to be printed in the printing apparatus 1, and transmit a print execution command to the printing apparatus 1. The information processing apparatus 2 may include, for example, a smartphone, a personal computer, and a tablet computer. Numbers of the printing apparatus 1 and the information processing apparatus 2 in the printing system 100 may not necessarily be limited to those illustrated in FIG. 1.

The printing apparatus 1 includes, as represented by the printing apparatus 1A in FIG. 1, a controller 11, an image printer 12, an operation panel 13, and a network interface 14. The controller 11 includes a CPU and a memory and may control devices and parts in the printing apparatus 1. The controller 11 drawn as a single piece of hardware controller in FIG. 1 may not necessarily be limited to a single piece of hardware controller but may include a plurality of hardware devices that may collectively control the printing apparatus 1.

The image printer 12 may print an image on a printable medium in an image forming technic, which may be, for example, an electro-photographic technic or an inkjet printing technic. The printing apparatus 1 may be capable of printing either colored images or monochrome images. The operation panel 13 may include, for example, a touch panel, which may accept a user's input and display information. The operation panel 13 may include indicator lamps and buttons. The network interface 14 may include a hardware device to establish communication with the information processing apparatus 2.

The information processing apparatus 2 includes, as shown in FIG. 1, a CPU 21, a ROM 22, a RAM 23, a non-volatile memory 24, an operation/display interface 26, and a network interface 27. The ROM 22 may store programs including an activation program to activate the information processing apparatus 2. The RAM 23 may be used as a work area for processing data and as a temporary memory area to store data temporarily. The non-volatile memory 24 may include, for example, an HDD and a flash memory, and store programs and data therein.

The CPU 21 may process information according to programs read from the ROM 22 and the non-volatile memory 24. The operation/display interface 26 may include, for example, a touch panel, which may accept a user's input and display information. The operation/display interface 26 may include, for example, a keyboard, a mouse, and a display. The network interface 27 may include a hardware device to establish communication with the printing apparatus 1.

In the printing system 100, the information processing apparatus 2 and the printing apparatus 1 may communicate with each other wirelessly in conformity with Wi-Fi (registered trademark) standard through a common access point 3. In this regard, the network interfaces 14, 27 are interfaces that enable wireless communication in conformity with the Wi-Fi standard, more specifically, with IEEE 802.11 standard or other standards in compliance with IEEE 802.11. However, the technology to establish wireless communication between the information processing apparatus 2 and the printing apparatus 1 may not necessarily be limited to the Wi-Fi standard. For example, the information processing apparatus 2 and the printing apparatus 1 may wirelessly communicate with each other through direct connection without communicating through the access point 3. Optionally or alternatively, the information processing apparatus 2 and the printing apparatus 1 may be connected with each other through, for example, LAN cables or USB cables for wired communication.

Figure 2:
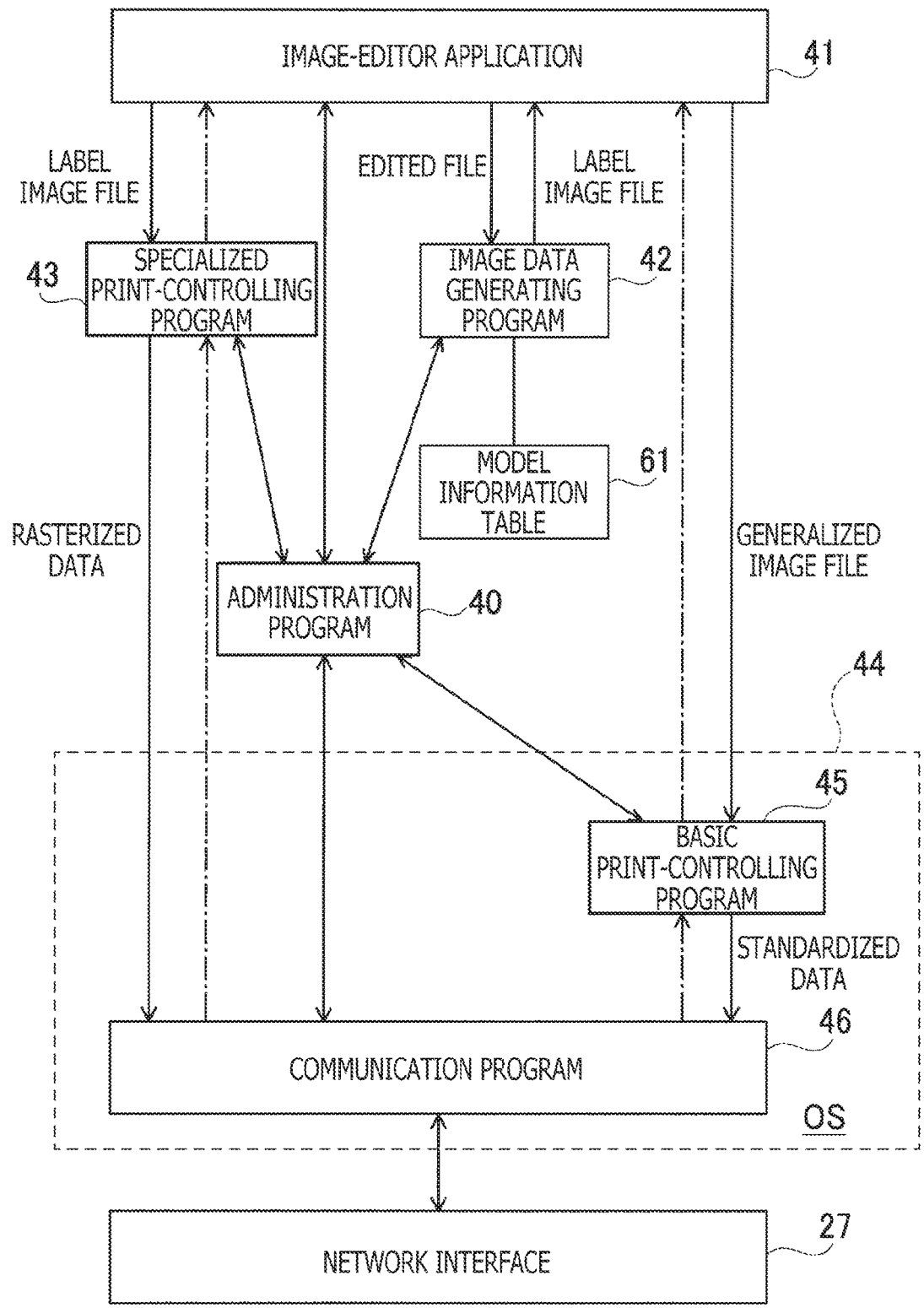
FIG. 2 is a block diagram to illustrate printing programs in an information processing apparatus in the printing system according to the embodiment of the present disclosure.

The non-volatile memory 24 in the information processing apparatus 2 stores, as shown in FIG. 2, an administration program 40, an image-editor application 41 being an application program for editing images, an image data generating program 42, a specialized print-controlling program 43, an operating system (OS) 44. The OS 44 for the information processing apparatus 2 includes a basic print-controlling program 45 and a communication program 46. In the following paragraphs, an application program may be referred to as an application. In FIG. 2, directions of flows of data for printing from one program to another program are indicated by solid arrows.

The administration program 40 may exchange data with the image-editor application 41, the image data generating program 42, and the specialized print-controlling program 43. For example, when a print command for printing an image is entered through the image-editor application 41, the administration program 40 may appoint a printing apparatus 1 to print the image and command the image data generating program 42 to generate image data adapted to features of the appointed printing apparatus 1. The administration program 40 may not be provided by the OS 44 but may be installed in the information processing apparatus 2 separately from the OS 44. The administration program 40 is an example of an administering and of an administering means.

The image-editor application 41 is a program module having functions to, for example, accept commands from a user, display an image, and edit and save the image. The image-editor application 41 may display a preview image through the operation/display interface 26 based on a command from the user. The image-editor application 41 may accept entry of print settings required to print an image. The image-editor application 41 may, as indicated by dash-and-dot lines in FIG. 2, obtain status information concerning a status of the printing apparatus 1 through the specialized print-controlling program 43 and the basic print-controlling program 45. The status information may include, for example, a print completion report and an error report.

The image data generating program 42 is a program module having a function to create an image file for an image to be printed. The image data generating program 42 in the information processing apparatus 2 may, for example, create a label image file according to a command accepted by the image-editor application 41. The label image file may be a data file, or a unit of data in any other format, to print an image on a label medium, which may be a strip of tape. In the present embodiment, the image data generating program 42 may generate a label image file.

A procedure for the image-editor application 41 to generate the label image file may include, for example, outputting a command through the administration program 40 to the image data generating program 42 to create a label image file and receiving the created label image file from the image data generating program 42. The image data generating program 42 is an example of a generating and of a generating means.

The specialized print-controlling program 43 is a program module having functions to, for example, generate rasterized data, by rasterizing image data contained in the label image file, and control the communication program 46 to transmit the rasterized data to the printing apparatus 1. The specialized print-controlling program 43 may be specifically designed to control a printing apparatus 1 in a specific model. Therefore, the specialized print-controlling program 43 may not control a printing apparatus in a different model from a different manufacturer. The specialized print-controlling program 43 may be a specialized program to control, for example, the printing apparatus 1A and may cope with more advanced or detailed print settings, which are applicable to image processing for printing the image in the printing apparatus 1A. The specialized print-controlling program 43 is an example of a specific print-controlling and of a specific print-controlling means.

The basic print-controlling program 45 is a program module having functions to generate standardized data for printing in conformity with a predetermined printing standard and control the communication program 46 to transmit the generated standardized data to the printing apparatus 1. The basic print-controlling program 45 is one of basic programs provided by the OS 44. The standardized data transmitted by the basic print-controlling program 45 may be data in conformity with a predetermined standard, which is feasible to, for example, the printing apparatus 1B equipped with a basic rasterization function, and is not rasterized. The basic print-controlling program 45 is an example of a basic print-controlling and of a basic print-controlling means.

The basic print-controlling program 45 is a general program designed to run on a variety of printing apparatuses that support a predetermined printing standard. In other words, as long as the printing apparatus 1 has a functionality to cope with the basic print-controlling program 45, the printing apparatus 1 may print an image by the standardized data regardless of a model or a manufacturer of the printing apparatus 1. Printing systems utilizing the basic print-controlling program 45 may include, for example, AirPrint (registered trademark) and Mopria (registered trademark).

In this regard, the label image file mentioned earlier may be more preferably processed by the specialized print-controlling program 43. The image-editor application 41 may transfer image data of an image to be printed to the specialized print-controlling program 43 or to the basic print-controlling program 45. When the image data is transferred to the specialized print-controlling program 43, the image-editor application 41 may transfer a label image file adapted to the printing apparatus 1 and to the specialized print-controlling program 43. On the other hand, when the image data is transferred to the basic print-controlling program 45, the image-editor application 41 may transfer a label image file, which is adapted to the basic print-controlling program 45.

The communication program 46 is a program module having a function to control the network interface 27 to communicate with another communication device. For example, the specialized print-controlling program 43 may transfer the rasterized data to the OS 44. The OS 44 in the information processing apparatus 2 may transmit the rasterized data from the communication program 46 to the printing apparatus 1 through the network interface 27. The communication program 46 is another one of the basic programs provided by the OS 44. A part of the communication program 46 may be stored in the ROM 22.

Figure 3:
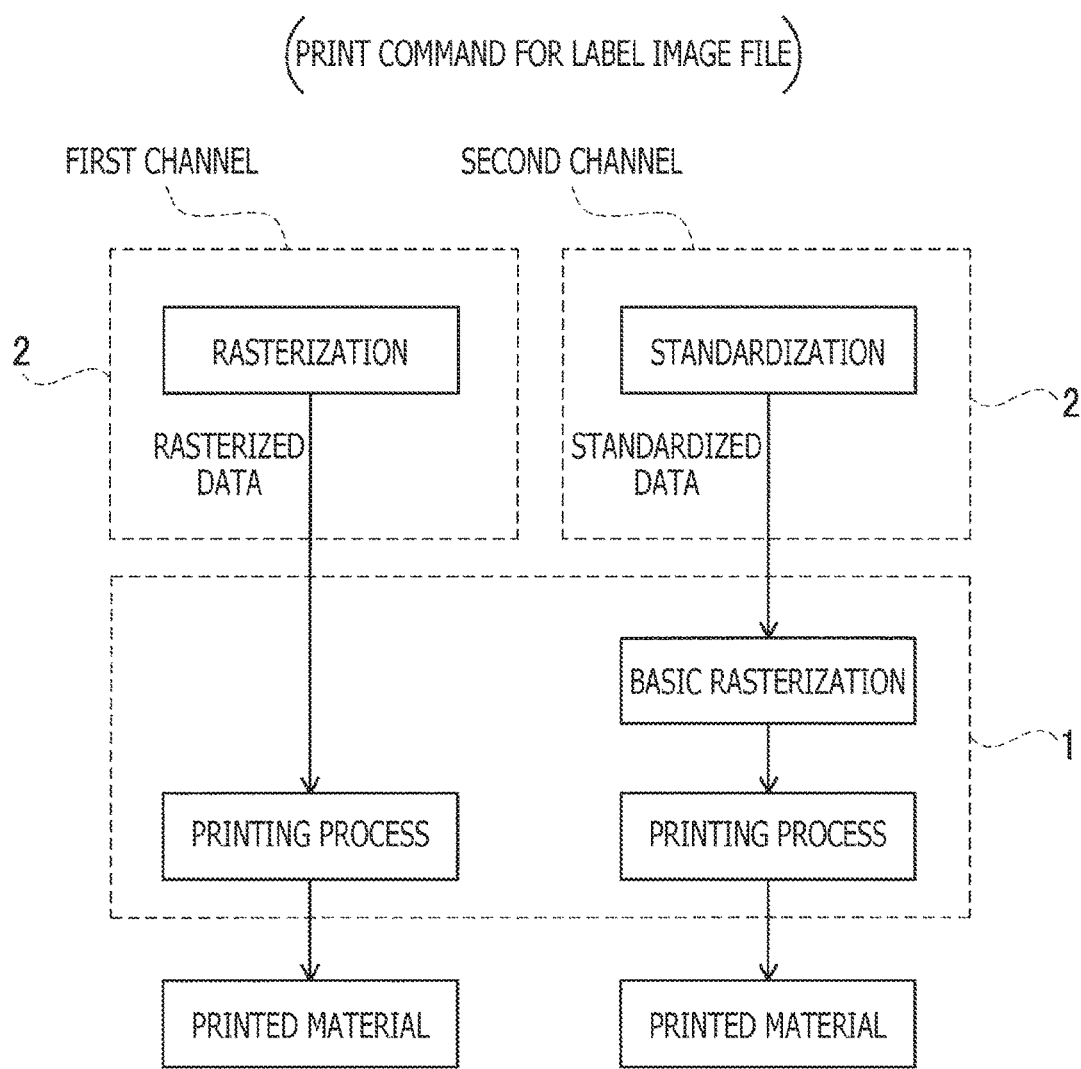
FIG. 3 is a block diagram to illustrate processing channels for the information processing apparatus in the printing system according to the embodiment of the present disclosure.

The printing system 100 may have, as indicated in FIG. 3, two (2) processing channels to cause the printing apparatus 1 to print an image. The processing channels include a first channel, in which the information processing apparatus 2 may rasterize the image data, and a second channel, in which the printing apparatus 1 may rasterize the image data.

In order to control the printing apparatus 1 to print the image through the first channel, the information processing apparatus 2 may, as shown in FIG. 3, rasterize the image data contained in the label image file in a rasterization process and transmit the rasterized data to the printing apparatus 1. The printing apparatus 1 may receive the rasterized data and output the image as a printed material based on the rasterized data having been received. Through the first channel, the information processing apparatus 2 uses the specialized print-controlling program 43 shown in FIG. 2 to rasterize the image data for the image to be printed.

Through the first channel, the data is processed by the specialized print-controlling program 43, which is feasible to the print settings that are applicable to the printing apparatus 1. The specialized print-controlling program 43 is not included in the OS 44; therefore, in order to print the image through the first channel, the information processing apparatus 2 may not use basic print-controlling functions (e.g., the basic print-controlling program 45) contained in the OS 44.

In order to control the printing apparatus 1 to print the image through the second channel, the information processing apparatus 2 may, as shown in FIG. 3, standardize the image data contained in the label image file in a standardization process and transmit the standardized data to the printing apparatus 1. The printing apparatus 1 may receive the standardized data, rasterize the standardized data in a general rasterization process, and output an image as a printed material based on the rasterized data having been rasterized. Through the second channel, the information processing apparatus 2 uses the basic print-controlling program 45 shown in FIG. 2 to standardize the image data of the image to be printed.

Through the second channel, the data is processed by the basic print-controlling program 45, which is the print-controlling function included in the OS 44. In this regard, some of the print settings applicable to a specific printing apparatus 1 may not be feasible to the basic print-controlling program 45. The basic print-controlling program 45 may only accept print settings that are feasible to commonly distributed models of printing apparatuses as valid print settings. For example, the basic print-controlling program 45 may not be adapted to handle print settings for features that are feasible to a specific model of a printing apparatus.

Thus, the first channel and the second channel differ in the subjects to process the image data of the image to be printed. Namely, through the first channel, it is the information processing apparatus 2 that rasterizes the image data. On the other hand, through the second channel, it is the printing apparatus 1 that rasterizes the image data. In other words, the first channel is a channel, in which the information processing apparatus 2 rasterizes the image data, and the second channel is a channel, in which the printing apparatus 1 rasterizes the image data. Further, the first channel and the second channel may differ in algorisms to rasterize the image data and in types or formats of data to be transmitted from the information processing apparatus 2 to the printing apparatus 1. Moreover, the first channel and the second channel may differ in conditions to apply some print settings, such as margin information, which will be described later in detail.

The first channel is a channel, which does not use a print-controlling function provided commonly by the OS 44, and the second channel is a channel, which uses the print-controlling function provided commonly by the OS. Moreover, the first channel is a channel, in which data with advanced print settings applied thereto may be rasterized, and the second channel is a channel, in which rasterization of some of the print settings may be limited.

Figure 4:
FIG. 4 is a table to illustrate correspondence between printing apparatuses and feasible processing channels in the printing system according to the embodiment of the present disclosure.

While some of the printing apparatuses 1 may be feasible to process data transmitted through either the first channel or the second channel, some other printing apparatuses 1 may be feasible to data transmitted through solely one of the first channel and the second channel. The information processing apparatus 2 may determine the processing channel(s) feasible to the printing apparatus 1 based on, for example, a model name, a model number, and a version number of firmware in the printing apparatus 1. The information processing apparatus 2 may store, for example, a feasible channel table 241 as shown in FIG. 4, which indicates the printing apparatus 1 and feasible channel(s) thereto, in the non-volatile memory 24. In the printing system 100 according to the present embodiment, the printing apparatus 1A is feasible solely to the first channel, the printing apparatus 1B is feasible solely to the second channel, and the printing apparatus 1C is feasible to both the first channel and the second channel. The information processing apparatus 2 may transmit data to the printing apparatus 1 wirelessly through the network interface 27 regardless of the processing channel to be used. In other words, whether the processing channel to be used to process the data to print the image is the first channel or the second channel, the communication method between the information processing apparatus 2 and the printing apparatus 1 may be fixed.

Figure 5:
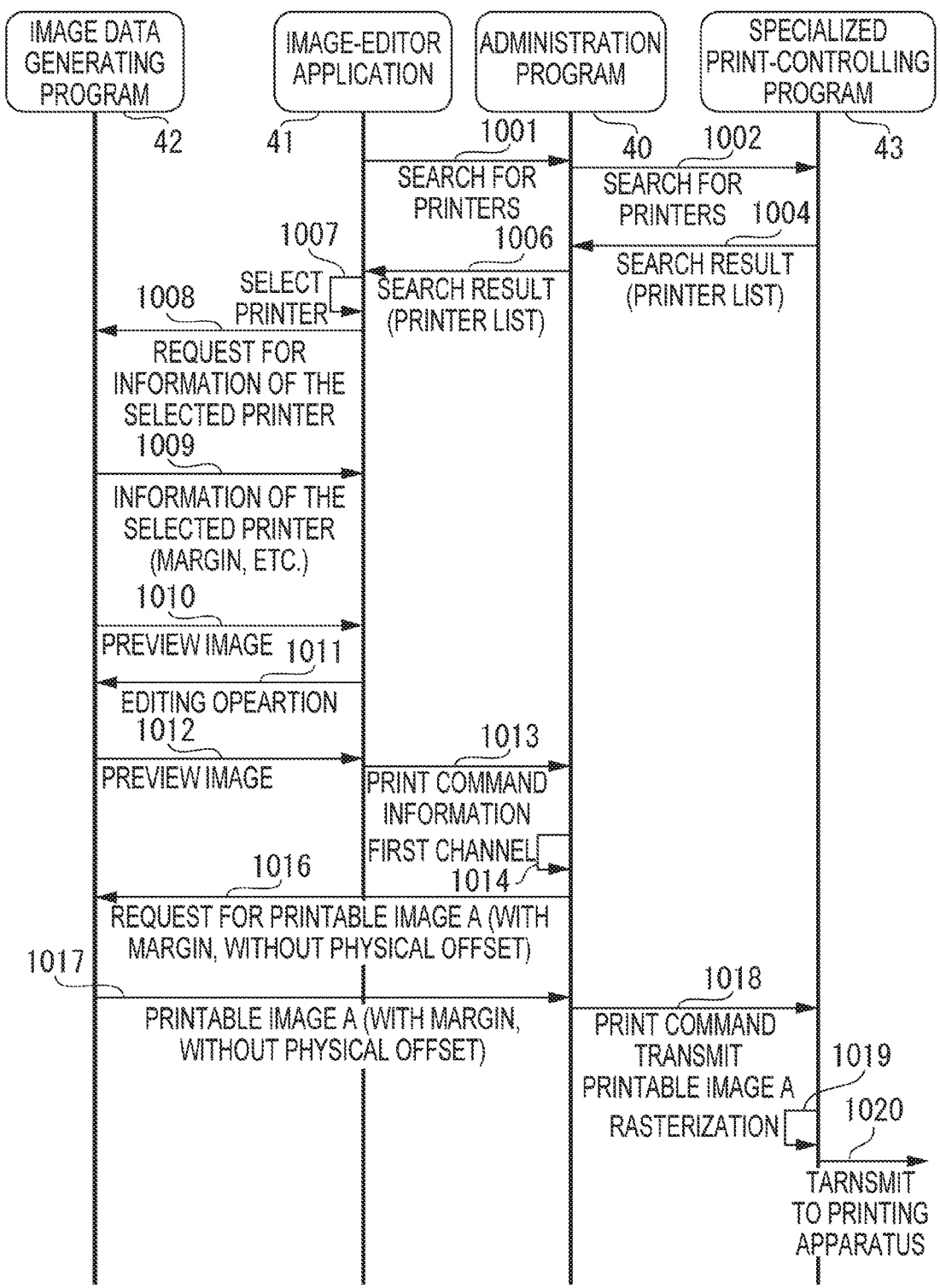
FIG. 5 illustrates a sequence of actions in the information processing apparatus through a first channel according to the embodiment of the present disclosure.
Figure 6:
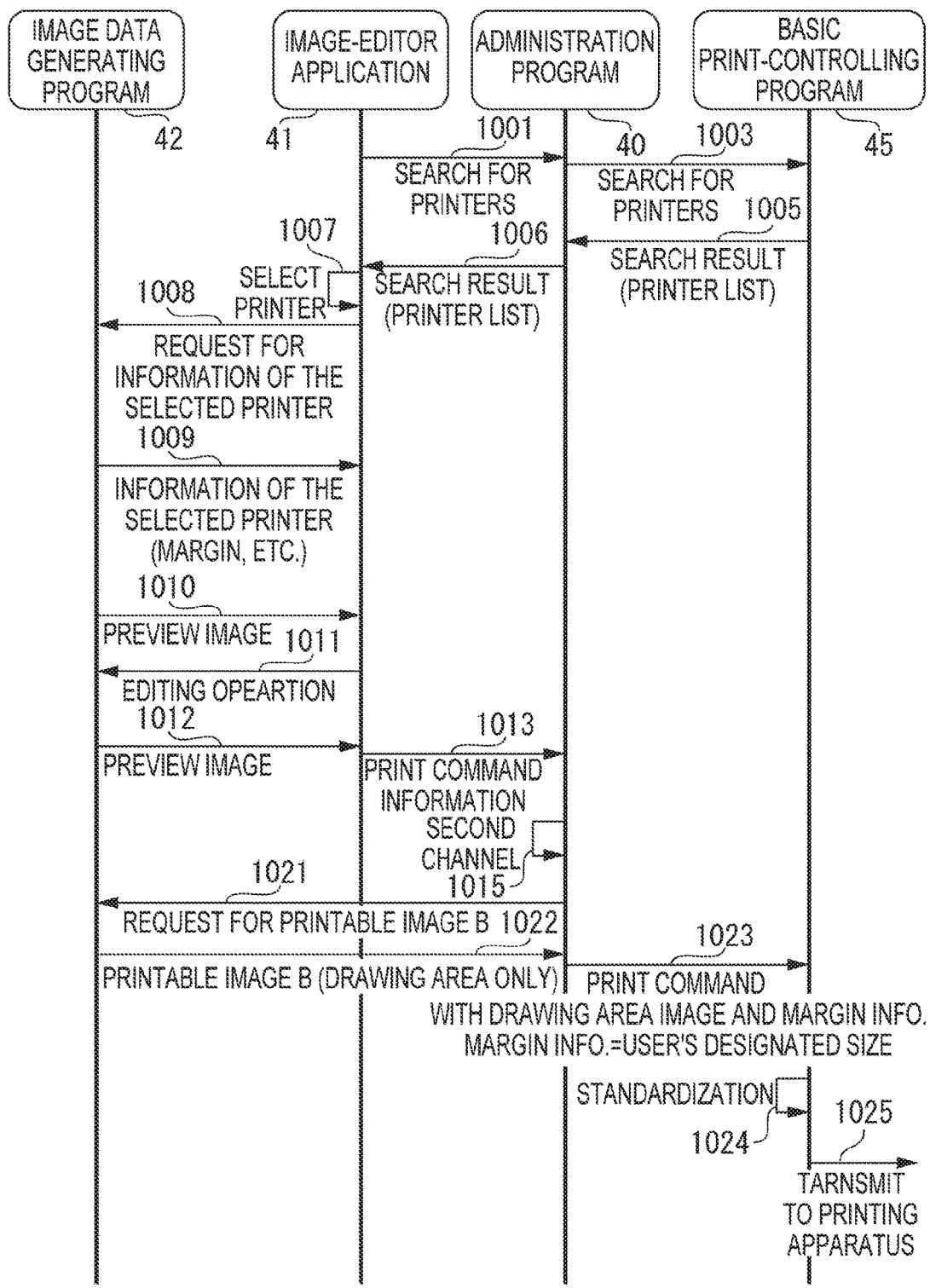
FIG. 6 illustrates a sequence of actions in the information processing apparatus through a second channel according to the embodiment of the present disclosure.

In the following paragraphs, with reference to FIGS. 5 and 6, described will be actions to be taken in the information processing apparatus 2 in the printing system 100. FIG. 5 illustrates a sequence of actions to be taken by the programs 40-43 when an image is printed through the first channel FIG. 6 illustrates a sequence of actions to be taken by the programs 40-42, 45 when an image is printed through the second channel. Some of the actions are common in the sequences in FIGS. 5 and 6, and those common actions may be denoted to by the same reference numbers, and description of those actions may not be repeated.

The information processing apparatus 2 in the printing system 100 is feasible to both the first channel and the second channel. The information processing apparatus 2 may conduct the actions that are common in the sequences in FIGS. 5 and 6 collectively once the information processing apparatus 2 accepts entry of a print command from a user and until one of the printing apparatuses 1A, 1B, 1C is determined to be the printing apparatus 1 to be used to print the image. Once the printing apparatus 1 to be used to print the image is determined, the remaining actions that are not common may be conducted individually in parallel with each other. If, for example, an information processing apparatus is feasible to conduct actions that are adapted to solely one of the first channel and the second channel, the information processing apparatus may conduct the actions that are adapted to the feasible channel alone.

A user who wishes to print an image based on a label image file in the printing system 100 may first activate the image-editor application 41 in the information processing apparatus 2 and edit the label image file containing image data for the image to be printed. When the image-editor application 41 is activated, the information processing apparatus 2 searches for the printing apparatus 1 available in the printing system 100. In particular, in 1001, the image-editor application 41 commands the administration program 40 to search for the printing apparatus 1.

The administration program 40 outputs a command to the specialized print-controlling program 43 and the basic print-controlling program 45 to search for the printing apparatus 1 which is usable in each channel. In particular, in 1002 (see FIG. 5), the administration program 40 commands the specialized print-controlling program 43 to search for the printing apparatus 1 feasible to the first channel. In 1003 (see FIG. 6), the administration program 40 searches for the printing apparatus 1 feasible to the second channel, of which information is stored by the OS 44.

In 1004 (see FIG. 5), the specialized print-controlling program 43 replies to the administration program 40 with a list of the printing apparatus 1 that is feasible to the first channel. For example, the specialized print-controlling program 43 may reply to the administration program 40 with a list containing the printing apparatus 1A and the printing apparatus 1C. In 1005 (see FIG. 6), the basic print-controlling program 45 replies to the administration program 40 with a list of the printing apparatus 1 that is feasible to the second channel. For example, the basic print-controlling program 45 may reply to the administration program 41 with a list containing the printing apparatus 1B and the printing apparatus 1C.

In 1006, based on the replies from the specialized print-controlling program 43 and the basic print-controlling program 45, the administration program 40 replies to the image-editor application 41 with a list of the printing apparatuses 1 that are usable in the printing system 100. The image-editor application 41, based on the reply from the administration program 40, designates one of the usable printing apparatuses 1 to be a primary printing apparatus 1 to be used for printing the image. Moreover, the image-editor application 41 designates one of the printing media usable in the primary printing apparatus 1 as a primary printing medium.

The image-editor application 41 displays an editor screen 51 as shown in, for example, FIG. 7, in the operation/display interface 26 based on the primary settings. The editor screen 51 may contain, for example, a preview image 52 showing an anticipated appearance of the image to be printed, a printer selecting field 53, a medium selecting field 54, a margin selecting field 55, a print button 56, and a cancel button 57. The image-editor application 41 may display the preview image 52 based on the label image file being edited.

FIG. 8 shows an example of the preview image 52. The preview image 52 includes an outer frame 521, a drawing area outline 522, and a drawn image 523. The outer frame 521 represents an outline of the printing medium having been selected. The drawn area outline 522 is indicated in a broken line and represents an outline of an area, in which the image is drawn. The drawn area outline 522, which may be displayed for the user to recognize margins being entered, is not printed on the printing medium. The drawn image 523 expresses the image to be printed and is displayed inside the outline of the printing medium.

While the preview image 52 shown in FIG. 8 contains text "XYZ," contents in the drawn image 523 may not necessarily be limited to text but may contain other types of objects such as, for example, graphics, pictures, figures, and barcode.

The printing apparatus 1 is, due to its mechanical limitation, unable to print an image in a peripheral area ranging for a predetermined amount from edges of the printing medium. In this regard, in FIG. 8, a physical printable area outline 524 representing a physically printable area is drawn in dash-and-dot lines. Meanwhile, the physical printable area outline 524 is not displayed in the preview image 52 in the editor screen 51. In the following paragraphs, a distance between the outer frame 521 and the physical printable area outline 524 will be called as a physical offset amount 525. The physical offset amount 525 at four (4) sides (i.e., upward, downward, rightward, and leftward sides of the physical printable area outline 524) may be equal. Alternatively, depending on, for example, a model of the printing apparatus 1 and a type of a label sheet, the physical offset amount 525 at the four sides may be different.

The information processing apparatus 2 stores a model information table 61 as shown in FIG. 9, in which the models of the printing apparatus 1 are associated with the physical offset amounts 525, in the mon-volatile memory 24. The model information table 61 contains model information, which is information unique to each model of the printing apparatus 1 usable at least with the information processing apparatus 2.

The model information in the model information table 61 may be, for example, updated by the administration program 40 each time a new printing apparatus 1 is connected to the printing system 100. Additionally or optionally, the administration program 40 may update the model information at predetermined timing. For example, the administration program 40 may update the model information each time when image printing by the printing apparatus 1 is completed, when the image-editor application 41 is activated, and/or when a predetermine threshold length of time since the latest update elapsed.

The image-editor application 41 may accept entry of a command from the user through the editor screen 51 and display the preview image 52 edited according to the entered command from the user. The editor screen 51 is an example of a user interface. The image-editor application 41 may, for example, display a list of usable printing apparatuses 1 in the printer selecting field 53 based on the reply from the administration program 40 and accept entry of the user's selection.

The image-editor application 41 may accept entries of commands from the user concerning the printing medium to be used and an amount of the margin through the medium selecting field 54 and the margin selecting field 55 in the editor screen 51. The image-editor application 41 displays the outer frame 521 of the preview image 52 based on the user's command entered through the medium selecting field 54. Further, the image-editor application 41 may move the drawing area outline 522 in the preview image 52 according to the command from the user entered through the margin selecting field 55. Thus, the margin amount 526 being the distance between the outer frame 521 and the drawing area outline 522 is variable depending on the print settings, in other words, depending on the user's preference. The margin amount 526 at the upper, lower, rightward, and leftward sides may be set independently from one another. In this regard, however, the image-editor application 41 prohibits the margin amount 526 to be smaller than the physical offset amount 525.

Referring back to FIGS. 5 and 6, in 1007, the image-editor application 42 accepts the user's selection for the printing apparatus 1 among the printing apparatuses 1 included in the reply from the administration program 40 and displays the selected printing apparatus 1 in the printer selecting field 53. In 1008, the image-editor application 41 requests information concerning the selected printing apparatus 1 from the image data generating program 42. In 1009, based on the request from the image-editor application 41, the image data generating program 42 refers to the model information table 61 and replies to the image-editor application 41 by the model information of the selected printing apparatus 1. The model information of the printing apparatus 1 may include, for example, information concerning the physical offset amount 525 and information concerning selectable printing media.

In 1010, the image-editor application 41 commands the image data generating program 42 to generate image data for the preview image 52 using the model information. In 1011, the image-editor application 41 accepts an editing operation from the user to the editor screen 51. In 1012, the image-editor application 41 displays the preview image 52 altered in accordance with the editing operations. In particular, the image-editor application 41 commands the image data generating program 42 to generate image data for the preview image 52 according to the editing commands. In doing so, the image-editor application 41 limits an allowable range of the margin amount 526 so that the margin amount 526 may be larger than the physical offset amount 525 in the model information achieved from the image data generating program 42.

When the print button 56 is operated through the editor screen 51, in 1013, in order to print an image being currently displayed in the preview image 52 by the printing apparatus 1, the image-editor application 41 transfers print command information to the administration program 40. The behavior of the image-editor application 41 to accept the operation to the print button 56 is an example of an accepting and of an accepting means.

The administration program 40 receiving the print command information from the image-editor application 41 may act differently depending on the feasible processing channel, between the first channel and the second channel, for the selected printing apparatus 1. In order to act suitably with the processing channel that is feasible to the selected printing apparatus 1, first, the administration program 40 selects one of the first channel and the second channel based on information concerning the printing apparatus 1 contained in the print command information having been received. For example, the administration program 40 may identify a model of the printing apparatus 1 having been selected since the acceptance of the print command and select one of the first channel and the second channel with reference to information concerning the identified model of the printing apparatus 1 and the information in the feasible channel table 241. A series of the actions by the administration program 40 in a chronological range from the command to search for the printing apparatus 1 (i.e., 1002 in FIGS. 5 and 1003 in FIG. 6), through the receipt of the print command information, to the selection of the processing channel (i.e., 1013 in FIGS. 5 and 6) is an example of selecting one of the first channel and the second channel by the administering. The administration program 40 that implements the selecting is an example of a selecting means.

The administration program 40 thereafter commands the image data generating program 42 to generate image data for the image designated to be printed, i.e., image data for an image equivalent to the preview image 52 being displayed at the time when the print command is accepted. The generated image data will be transmitted from the information processing apparatus 2 to the printing apparatus 1 later, and margin information is appended to the image data to be transmitted from the information processing apparatus 2 to the printing apparatus 1. In this regard, a content of the margin information to be appended to the image data differs depending on the processing channel being selected. Therefore, depending on the selected processing channel between the first channel and the second channel, the administration program 40 commands the image data generating program to generate the image data with different margin information.

When the administration program 40 determines that the first channel is selected, for actions following 1014 (see FIG.

5), the programs 40-43 may follow the sequence illustrated in FIG. 5 and does not follow the sequence illustrated in FIG. 6. On the other hand, when the administration program 40 determines that the second channel is selected, for actions following 1015 (see FIG. 6), the programs 40-42 and 45 may follow the sequence illustrated in FIG. 6 and does not follow the sequence illustrated in FIG. 5. Thus, after 1014 or 1015, the administration program 40 takes actions adapted to solely one of the first channel (1016-1020) and the second channel (1021-1025).

The specialized print-controlling program 43 is a program adapted to run on a specific printing apparatus, e.g., the printing apparatus 1A, using the information concerning the physical offset amount 525 preset for the specific printing apparatus. Meanwhile, the image data to be transferred from the administration program 40 to the specialized print-controlling program 43 is the image data of the image in the printable range, not including the physical offset amount 525. Therefore, the margin information for the first channel, i.e., the margin information appended to the image data to be transferred from the administration program 40 to the specialized print-controlling program 43, is a remainder amount of subtraction, subtracting the physical offset amount 526 from the margin amount 526 designated by the user. In other words, the margin amount 526 designated by the user, but not including the physical offset amount 526, is appended as the margin information to the image data and transferred from the administration program 40 to the specialized print-controlling program 43. Appending the margin amount 526 exclusive of the physical offset amount 526 as the margin information to the image data is an example of a first margin condition.

Therefore, when, for example, the selected printing apparatus 1 is the printing apparatus 1A, in 1016 (see FIG. 5), the administration program 40 may command the image data generating program 42 to generate printable image A. The printable image A is the image data with the margin information adapted to the first channel appended thereto. The printable image A is, therefore, in the example shown in FIG. 8, the image data for the area inside the physical printable area outline 524. The printable image A is an example of first-typed image data. The action by the administration program 40 to command the image data generating program 42 to generate the printable image A is an example of commanding by the administering. The administration program 40 that implements the commanding is an example of a commanding means.

Based on the command from the administration program 40, in 1017, the image data generating program 42 generates the printable image A and transfer the printable image A to the administration program 40. In 1018, the administration program 40 outputs the printable image A received from the image data generating program 42 and a print command to the specialized print-controlling program 43. The action by the administration program 40 to output the printable image A and the print command to the specialized print-controlling program 43 is an example of outputting the first-typed image data to the first channel when the first-type image data is generated. The administration program 40 that implements the outputting is an example of an outputting means.

In 1019, the specialized print-controlling program 43 rasterizes the printable image A received from the administration program 40 to generate rasterized data. In 1020, the specialized print-controlling program 43 transmits the rasterized data to the printing apparatus IA. The printing apparatus 1A performs image printing through the first channel based on the rasterized data received from the specialized print-controlling program 43. Through these actions, the printing apparatus 1A may print the image with the designated amount of margin on the printable medium.

Meanwhile, the basic print-controlling program 45 is a common program, which may run generally on a common printing apparatus and does not use the physical offset amount 525 to print an image. The data to be transferred from the administration program 40 to the basic print-controlling program 45 may be, for example, image data for a portion in the drawn image 523 in the preview image 52 together with position information, which indicates a print start position P for the drawn image 523, appended thereto. The position information of the print start position P may indicate a position of the print start position P with respect to the outer frame 521. In other words, the margin information contained in the image data to be transferred from the administration program 40 to the basic print-controlling program 45 may be, for example, the position information of the print start position P for the drawn image 523. Appending the position information of the print start position P for the drawn image 523 to the image data as the margin information is an example of a second margin condition.

Therefore, if the selected printing apparatus 1 is, for example, the printing apparatus 1B, in 1021 (see FIG. 6), the administration program 40 may command the image data generating program 42 in the printing apparatus 1B to generate printable image B. In this regard, the printable image B is image data exclusive the margin. The printable image B may be, in the example shown in FIG. 8, the image data for the drawn image 523. The printable image B is an example of second-typed image data. The action by the administration program 40 to command the image data generating program 42 to generate the printable image B is an example of commanding to generate the second-typed image data when the second channel is selected. The administration program 40 that implements the commanding is an example of a commanding means.

In reply to the command from the administration program 40, in 1022, the image data generating program 42 generates the printable image B and transfers the generated printable image B to the administration program 40. In 1023, the administration program 40 outputs the printable image B received from the image data generating program 42 to the basic print-controlling program 45. In particular, the administration program 40 appends the position information of the print start position P to be included in the printable image B as the margin information and outputs the printable image B including the margin information to the basic print-controlling program 45. The action by the administration program 40 to output the printable image B and the position information of the print start position P to the basic print-controlling program 45 is an example of outputting one of the first-typed image data generated in the generating module to the first channel and the second-typed image data generated in the generating module to the second channel. The margin information to be included in the printable image B may not necessarily be limited to the position information of the print start position B but may be, for example, information indicating an amount of the margin.

In 1024, the basic print-controlling program 45 standardizes the printable image B received from the administration program 40 and generates standardized data. In 1025, the basic print-controlling program 45 transmits the standardized data to the printing apparatus 1B. The printing apparatus 1B receiving the standardized data performs image printing through the second channel according to the standardized data based on the printable image B and the margin information included therein. Through these actions, the printing apparatus 1B may print the image with the designated amount of margin on the printable medium.

Optionally, the printable image B being the data to be transferred from the administration program 45 to the basic print-controlling program 45 may be image data for an entire range within the outer frame 521, including the margin, spreading from an origin being the print start position. In this case, it may not be necessary to append the margin information to the image data, but the printing apparatus 1B may perform image printing based on the printable image B without the margin information. Thus, when the printable image B includes the margins, the printing apparatus 1B may handle the image data easily without being concerned about the margin information. Meanwhile, when the margin information is appended to the image data, as shown in 1021 in FIG. 6, the image data does not contain data for the margins; therefore, a volume of the data to be transmitted to the basic print-controlling program 45 may be smaller. In this regard, communication load may be reduced. The printable image B being the image data for the entire range within the outer frame 521, including the margins, is another example of the second-typed image data.

Next, in the following paragraphs, with reference to FIG. 10, described will be a flow of steps in a printing process to be conducted by the CPU 21 in the information processing apparatus 2 in the printing system 100 according to the embodiment of the present disclosure. The printing process may be executed by the CPU 21 in the information processing apparatus 2 in response to the user's actions to appoint the image to be printed and a printing apparatus 1 to print the image and an action to enter a print command through the active image-editor application 41.

As the printing process starts, in S101, the CPU 21 determines the selected printing apparatus 1 to be the apparatus to print the image. In S102, based on the feasible channel table 241 (see FIG. 3), the CPU 21 obtains a channel feasible to the determined printing apparatus 1.

In S103, the CPU 21 determines whether the obtained feasible channel includes the first channel. If the CPU 21 determines that the first channel is included (S103: YES), in S104, the CPU 21 conducts a printable image A generating process.

In the following paragraphs, with reference to FIG. 11, described will be a flow of steps in the printable image A generating process to be conducted by the CPU 21 in the information processing apparatus 2. As the printable image A generating process starts, in S201, the CPU 21 obtains the information concerning the physical offset amount 525 for the printing apparatus 1 having been selected based on, for example, the model information table 61 (see FIG. 9). The physical offset amount 525 may differ depending on the model of the printing apparatus 1; therefore, the physical offset amount 525 may be obtained on basis of the model so that the physical offset amount 525 suitable to the printing apparatus 1 may be used.

In S202, the CPU 21 obtains the margin amount 526 from the image-editor application 41 entered through the editor screen 51. In S203, the CPU 21 obtains the margin information based on the remainder produced by subtracting the physical offset amount 526 from the margin amount 526.

In S204, the CPU 21 appends the margin information to the image data for the drawn image 523 and rasterizes the data through the specialized print-controlling program 43. The CPU 21 exits the printable image A generating process. In particular, the CPU 21 transfers the image data containing the margins to the specialized print-controlling program 43, and the specialized print-controlling program 43 rasterizes the transferred data to generate the printable image A.

The CPU 21 returns to the printing process (see FIG. 10). In S105, the CPU 21 controls the network interface 27 to transmit the printable image A being the rasterized data obtained through the printable image A generating process to the currently selected printing apparatus 1.

On the other hand, in S103, if the obtained feasible channel does not include the first channel (S103: NO), in S106, the CPU 21 determines whether the obtained feasible channel includes the second channel. If the CPU 21 determines that the obtained feasible channel includes the second channel (S106: YES), in S107, the CPU 21 conducts a process to generate the printable image B, which is the image data not including margins but includes the drawn image 523 alone. In particular, in S107, the CPU 21 standardizes the image data of the portion for the drawn image 523 through the basic print-controlling program 45 to generate the printable image B being standardized data. In S108, the CPU 21 controls the network interface 27 to transmit the printable image B being the standardized data to the printing apparatus 1.

Following S105 or S108, in S109, the CPU 21 determines whether a signal indicating completion of image printing is received from the printing apparatus 1. The printing apparatus 1 receiving the printable image A or B from the information processing apparatus 2 may perform image printing, and when image printing is completed, the printing apparatus 1 may transmit a signal containing information that indicates completion of image printing to the information processing apparatus 2. In other words, the information processing apparatus 2 may determine image printing is completed when the signal indicating completion of image printing is received from the printing apparatus 1.

In S109, if the CPU 21 determines that no signal indicating completion of image printing is received (S109: NO), in S110, the CPU 21 determines whether a signal indicating occurrence of an error is received. The printing apparatus 1 may transmit a signal to report an error to the information processing apparatus 2 when, for example, the printable image is not securely received, or printing of the printable image is not completed securely. If the CPU 21 determines that the information processing apparatus 2 has not received the information indicating an error in the printing apparatus 1 (S110: NO), the CPU 21 determines whether the communication with the printing apparatus 1 timed out.

If the CPU 21 determines that the communication has not timed out (S111: NO), the CPU 21 returns to S109 and waits until either one of a signal indicating image-printing completion and a signal indicating an error is received or the communication times out. In S109, if one of the signals is received (S109: YES), the CPU 21 ends the printing process.

In S106, meanwhile, if the CPU 21 determines that the obtained feasible channel includes neither the first channel nor the second channel (S106: NO), the flow proceeds to S110. In S110, if a signal indicating an error is received from the printing apparatus 1 (S110: YES), or in S111, if the communication times out (S111: YES), in S112, the CPU 21 controls the operation/display interface 26 to display a message and ends the printing process. The information processing apparatus 2 may, for example, display an error indicating message in the editor screen 51 through the running image-editor application 41. Thereby, the information processing apparatus 2 may inform the user that the image printing was not completed securely.

Next, in the following paragraphs, with reference to FIG. 12, described will be a flow of steps in a print-execution process to be conducted by the printing apparatus 1 in order to interact with the information processing apparatus 2 as described earlier. The print-execution process shown in FIG. 12 may be executed by a printing apparatus 1, e.g., the printing apparatus 1C, which is feasible to both the first channel and the second channel. The print-execution process may be executed by, for example, the controller 11 in the printing apparatus 1C in response to receiving the data for printing, e.g., the printable image A or printable image B, from the information processing apparatus 2.

As the print-execution process starts, in S301, the controller 11 determines whether the received data is the printable image A. If the controller 11 determines that the received data is not the printable image A (S301: NO), in S302, the controller 11 applies basic rasterization to the received data. In other words, when the received data is the printable image B being standardized data, the printing apparatus 1 uses the basic rasterizing function installed in the printing apparatus 1 to generate the rasterized data. In S301, if the controller 11 determines that the received data is the printable image A (S301: YES), the controller 11 skips S302 and proceeds to S303.

In S303, the controller 11 controls the image printer 12 to print an image based on either the rasterized data contained in the received printable image A or the rasterized data generated in S302. In S304, the controller 11 determines whether image printing is completed. If the controller 11 determines that image printing is not completed (S304: NO), in S305, the controller 11 determines whether image printing timed out. If the controller 11 determines that image printing has not timed out (S305: NO), the controller 11 returns to S303 and continues printing the image.

In S304, if the controller 11 determines that image printing is completed (S304: YES), in S306, the controller 11 controls the network interface 14 to transmit information indicating completion of image printing to the information processing apparatus 2 and ends the print-execution process thereat. In S305, on the other hand, if the controller 11 determines that image printing timed out (S305: YES), in S307, the controller 11 controls the network interface 14 to transmit information indicating an error to the information processing apparatus 2 and ends the print-execution process thereat. Additionally, the controller 11 may transmit information indicating an error to the information processing apparatus 2 when, for example, the controller 11 fails to receive the data from the information processing apparatus 2 and when an error occurs in the basic rasterization of the standardized data.

Meanwhile, the printing apparatus 1A and the printing apparatus 1B are each feasible to either the first channel or the second channel. Therefore, the printing apparatus 1A or the printing apparatus 1B may issue an error report when the printing apparatus 1A or the printing apparatus 1B receives data infeasible thereto. For example, the controller 11 in the printing apparatus 1A making a negative determination in S301 (S301: NO) may proceed to S307 and transmit an error report to the information processing apparatus 2. For another example, the controller 11 in the printing apparatus 1B making an affirmative determination in S301 (S301: YES) may proceed to S307 and transmit an error report to the information processing apparatus 2.

As has been described above, according to the printing system 100 in the present embodiment, the printing apparatus 1 and the information processing apparatus 2 are connected to communicate wirelessly with each other so that an image based on the label image file in the information processing apparatus 2 may be printed by the printing apparatus 1. The printing system 100 has the first channel and the second channel, through which the image may be processed to be printed by the printing apparatus 1, and the information processing apparatus 2 may generate printable image, i.e., image data to be used for printing the image, with use of margin information, which is adapted to the selected channel, and transmit the generated printable image to the printing apparatus 1. Thus, the image data may be generated based on the margin condition, which may vary depending on the processing channel to be used, so that the image data adapted to the feasible processing channel may be generated. Therefore, through whichever the processing channel the image printing is performed, the margins in an appearance as desired by the user may likely be reproduced in the printed material, and the user may obtain the printed material in the preferable appearance.

Although an example of carrying out the invention has been described, those skilled in the art will appreciate that there are numerous variations and permutations of the printing system and the computer-readable storage medium storing the program that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the printing apparatus 1 may not necessarily be equipped with the operation panel 13. For another example, the memory medium in the information processing apparatus 2 may not necessarily be limited to the non-volatile memory 24 but may be any type of mass storage memory device.

For another example, the communication method between the printing apparatus 1 and the information processing apparatus 2 may not necessarily be limited to the wireless communication in compliance with the Wi-Fi standard but may be, for example, wired communication through a USB cable or wireless communication in compliance with Bluetooth (registered trademark). Further, the printing apparatus 1 and the information processing apparatus 2 may be adapted to a plurality of communication methods.

For another example, the image file for the image to be printed may not necessarily be limited to the label image file for printing a label on a tape. For example, the image file may be a compressed file including a PDF file, a JPEG file, etc., or may be a bitmap file. When the image file other than the label image file is used, an application program and a print-controlling program that may handle the image data equivalently to the image-editor application 41 and the specialized print-controlling program 43 may be adopted.

For another example, the second channel may not necessarily require rasterization in the printing apparatus 1; in other words, rasterization may be conducted in the information processing apparatus 2, as long as the second channel provides a processing channel different from the first channel. For example, if the basic print-controlling program 45 has the rasterizing function, the basic print-controlling program 45 may rasterize the image data by its own rasterizing function. In this configuration, the first channel and the second channel still differ in algorisms for the rasterization. In this configuration, further, while the first channel is a channel, which does not use the print-controlling function provided by the OS 44, and the second channel is a channel, which uses the print-controlling function provided by the OS 44.

For another example, the processing channels in the printing system 100 may not necessarily be limited to the first channel and the second channel, but the printing system 100 may have three or more channels. For example, the printing system 100 may have a channel, in which an image may be printed by a driver specialized to the device, and, a channel, in which an image may be printed by CUPS being a printer driver for UNIX (registered trademark), MacOS (registered trademark), and Linux (registered trademark). The device-specific driver and CUPS are programs embedded in the OS 44 (see FIG. 2) in the information processing apparatus 2 to rasterize image data. With these additional processing channels, one of the processing channels may be selected in the printing process, and the image data adapted to the selected processing channel may be generated and transmitted to the printing apparatus 1.

For another example, in the printing process, it may not necessarily be limited to the first channel that is selected to be used preferentially, but the second channel may be selected to be used preferentially. In other words, when the obtained feasible channel does not include the second channel, the CPU 21 may thereafter determine whether the obtained feasible channel includes the first channel. For example, S103 in FIG. 10 may be replaced with a step to determine whether the second channel is included in the obtained feasible channel. Further, S106 may be replaced with a step to determine whether the first channel is included in the obtained feasible channel. In this regard, however, the first channel may be more feasible to a wider range of print settings than the second channel. Therefore, by determining presence of the first channel preferentially over the second channel, the image may be more likely to be printed in a more preferable appearance to the user.

For another example, the information concerning the physical offset amount 525 may not necessarily be obtained from the model information table 61. For example, a server to administer information, including the physical offset amount 525, may be connected to the printing system 100, and the information processing apparatus 2 may obtain the information concerning the physical offset amount 525 from the server. For another example, the information processing apparatus 2 may communicate with the selected printing apparatus 1 and obtain the information concerning the physical offset amount directly from the printing apparatus 1.

For another example, the image-editor application 41 may not necessarily be equipped with the function to edit images. An image may be edited by a basic application program, while the image-editor application 41 may be equipped with a function to print an image in a file created by the basic application program.

For another example, the steps or the processes in the printing process described above may be accomplished by a single CPU, a plurality of CPUs, a hardware device such as an ASIC, or a combination of any of these. For another example, the steps or the processes in the above-described embodiment may be accomplished by various media or methods, including a recording medium storing the programs to implement the steps or the processes.

What is claimed is:

1. A non-transitory computer readable storage medium storing computer readable instructions that are executable by a computer in an information processing apparatus, the information processing apparatus comprising a communication interface, through which the information processing apparatus is connected with a printer, the information processing apparatus comprising a first channel and a second channel being processing channels configured to cause the printer to print an image based on data of the image, the computer readable instructions, when executed by the computer, causing the information processing apparatus to:
    generate image data in a generating;
    rasterize, when the generated image data is input, in a specific print-controlling, the generated image data and transmit, in the specific print-controlling, the rasterized image data to the printer; and
    output, in an administering, the generated image data to one of the first channel, through which the image is printed by the specific print-controlling, and the second channel, through which the image is printed by a basic print-controlling executed by an operating system installed in the information processing apparatus,
    wherein, in the administering, the computer readable instructions cause the information processing apparatus to:
        select one of the first channel and the second channel;
        command to generate first-typed image data when the first channel is selected, the first-typed image data being generated based on a first margin condition, and second-typed image data when the second channel is selected, the second-typed image data being generated based on a second margin condition; and
        output the generated first-typed image data to the first channel when the first-typed image data is generated and the generated second-typed image data to the second channel when the second-typed image data is generated.

2. The non-transitory computer readable storage medium according to claim 1,
    wherein the second-typed image data being generated based on the second margin condition is image data of an image exclusive of a margin, and
    wherein, in the administering, the computer readable instructions cause the information processing apparatus to output the second-typed image data along with information concerning the margin to the second channel.

3. The non-transitory computer readable storage medium according to claim 1,
    wherein the second-typed image data being generated based on the second margin condition is image data of an image including a margin.

4. The non-transitory computer readable storage medium according to claim 1,
    wherein the first-typed image data being generated based on the first margin condition is image data of an image with a designated margin amount exclusive of a physical offset amount, the physical offset amount being an amount of an area in which no image is printable.

5. The non-transitory computer readable storage medium according to claim 4,
    wherein, in the generating, the computer readable instructions cause the information processing apparatus to generate the first-typed image data with use of the physical offset amount associated with the printer connected with the information processing apparatus through the communication interface.

6. The non-transitory computer readable storage medium according to claim 5,
    wherein, in the administering, the computer readable instructions cause the information processing apparatus to identify a model of the printer connected through the communication interface with the information processing apparatus, refer to a table in which the model of the printer is associated with at least one of the first channel and the second channel as a feasible processing channel to the printer, determine one of the first channel and the second channel feasible to the printer, and select the determined one of the first channel and the second channel to be the processing channel, to which the one of the first-typed image data and the second-typed image data is output.

7. The non-transitory computer readable storage medium according to claim 1,
wherein the information processing apparatus further comprises a user interface,
wherein the computer readable instructions cause the information processing apparatus to accept a command entered through the user interface, and
wherein, when the information processing apparatus accepts a print command through the user interface, the computer readable instructions cause the information processing apparatus to output the generated image data to the selected one of the first channel and the second channel.

8. A method implementable on a processor coupled with an information processing apparatus in a printing system, the information processing apparatus being connected with a printer to communicate mutually through a specific communication interface, the printing system comprising processing channels configured to cause the printer to print an image based on data of the image, the processing channels including a first channel and a second channel, the method comprising:
generating image data in a generating;
rasterizing, when the generated image data is input, in a specific print-controlling, the generated image data in the information processing apparatus and transmitting, in the specific print-controlling, the rasterized image data to the printer; and
outputting the generated image data in the information processing apparatus to one of the first channel, through which the image is printed by the specific print-controlling, and the second channel, through which the image is printed by a basic print-controlling executed by an operating system installed in the information processing apparatus,
wherein the outputting the generated image data to the one of the first channel and the second channel includes:
selecting the one of the first channel and the second channel;
commanding to generate first-typed image data when the first channel is selected, the first-typed image data being generated based on a first margin condition, and second-typed image data when the second channel is selected, the second-typed image data being generated based on a second margin condition; and
outputting the first-typed image data to the first channel when the first-typed image data is generated and the second-typed image data to the second channel when the second-typed image data is generated.

9. The method according to claim 8,
wherein the second-typed image data being generated based on the second margin condition is image data of an image exclusive of a margin, and
wherein the second-typed image data to be output to the second channel is output along with information concerning the margin.

10. The method according to claim 8,
wherein the second-typed image data being generated based on the second margin condition is image data of an image including a margin.

11. The method according to claim 8,
wherein the first-typed image data being generated based on the first margin condition is image data of an image with a designated margin amount exclusive of a physical offset amount, the physical offset amount being an amount of an area in which no image is printable.

12. The method according to claim 11,
wherein the first-typed image data is generated with use of the physical offset amount associated with the printer connected with the information processing apparatus through the communication interface.

13. The method according to claim 12,
wherein the outputting the generated image data to the one of the first channel and the second channel further includes:
identifying a model of the printer connected through the communication interface with the information processing apparatus;
referring to a table in which the model of the printer is associated with at least one of the first channel and the second channel as a feasible processing channel to the printer;
determining one of the first channel and the second channel feasible to the printer; and
selecting the determined one of the first channel and the second channel to be the processing channel, to which the one of the first-typed image data and the second-typed image data is output.

14. The method according to claim 8,
wherein the information processing apparatus further comprises a user interface,
wherein a command to the information processing apparatus is acceptable through the user interface, and
wherein, when the information processing apparatus accepts a print command through the user interface, the image data is generated and output to the selected one of the first channel and the second channel.

15. A printing system comprising an information processing apparatus and a printer, the information processing apparatus and the printer being configured to communicate with each other through a specific communication interface, the printing system comprising processing channels configured to cause the printer to print an image based on data of the image, the processing channels including a first channel and a second channel,
wherein the information processing apparatus comprising:
a generating means configured to generate image data;
a specific print-controlling means associated with the printer, the specific print-controlling means being configured to rasterize the image data generated by the generating means in response to input of the image data therein and transmit the rasterized image data to the printer; and
an administering means configured to output the image data generated by the generating means from the generating means to one of the first channel, through which the image is printed with use of the specific print-controlling means, and the second channel, through which the image is printed with use of a basic print-controlling means executed by an operating system installed in the information processing apparatus, the administering means comprising:

a selecting means configured to select one of the first channel and the second channel;

a commanding means configured to command the generating means to generate one of first-typed image data when the first channel is selected by the selecting means, the first-typed image data being generated based on a first margin condition, and second-typed image data when the second channel is selected by the selecting means, the second-typed image data being generated based on a second margin condition; and an outputting means configured to output the first-typed image data to the first channel when the first-typed image data is generated by the generating means and the second-typed image data to the second channel when the second-typed image data is generated by the generating means.

* * * * *